Aug. 25, 1953  R. A. CLAPP  2,649,836
MOTION-PICTURE MACHINE AND FILM FEEDING MECHANISM
Filed Dec. 14, 1950  3 Sheets-Sheet 1
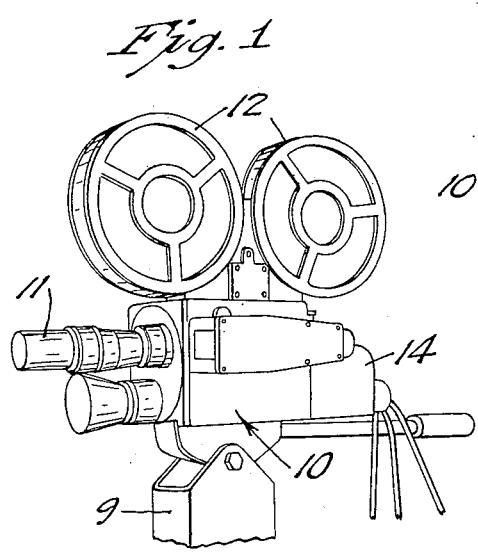
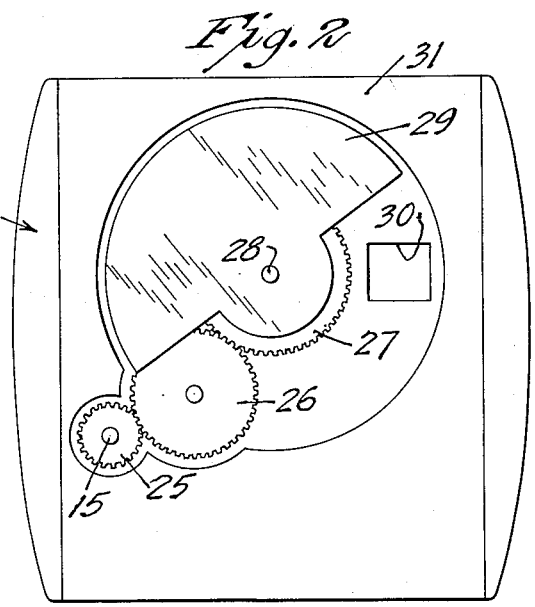
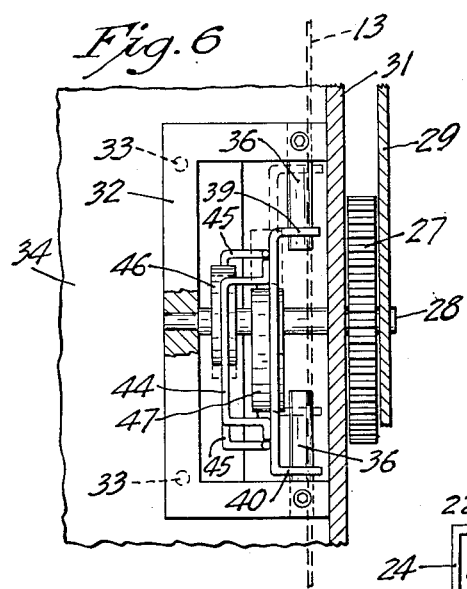
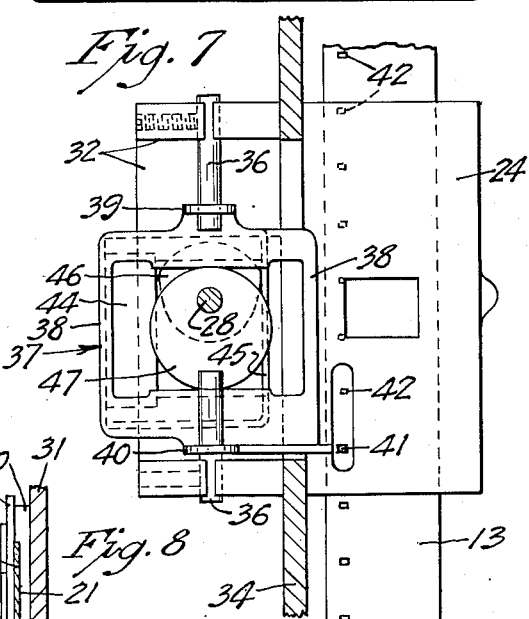
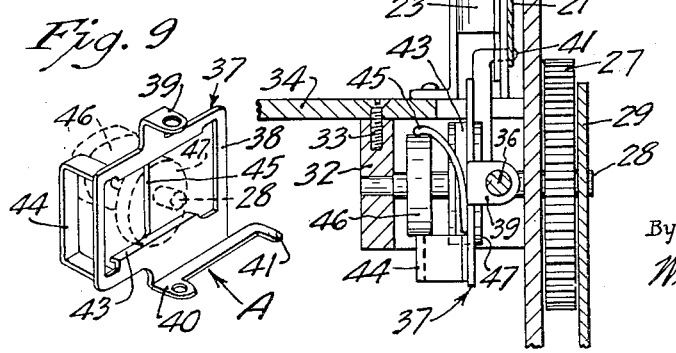
Inventor
Roy A. Clapp
By Williamson & Williamson
Attorneys

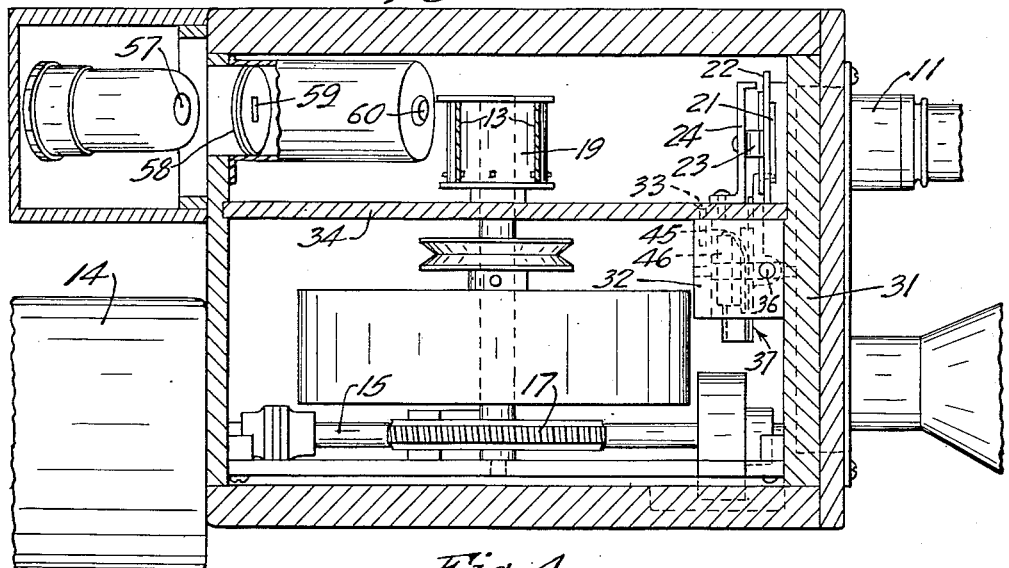
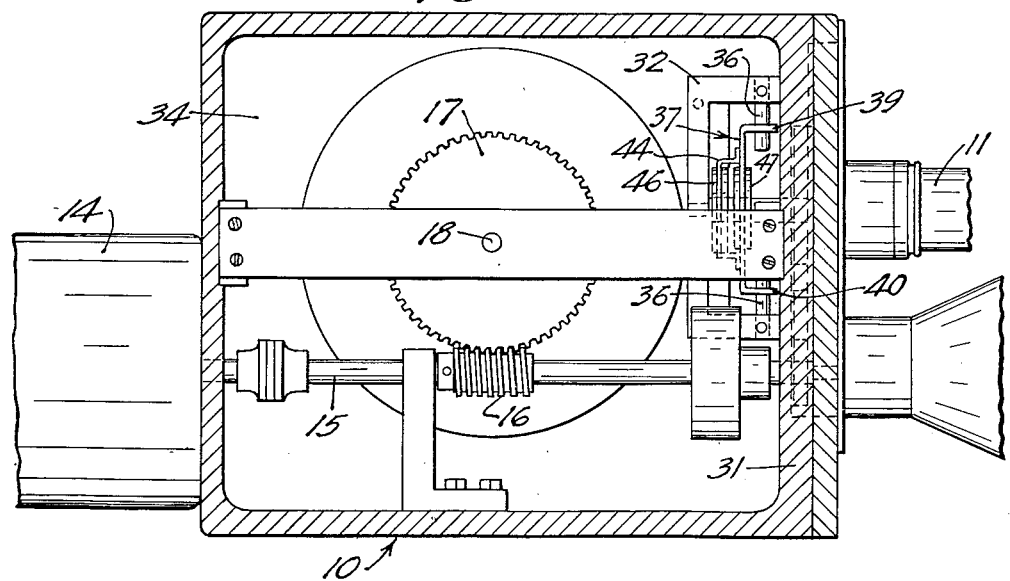

INVENTOR.
Roy A. Clapp
BY Williamson & Williamson
ATTORNEYS

Patented Aug. 25, 1953

2,649,836

UNITED STATES PATENT OFFICE 2,649,836

MOTION-PICTURE MACHINE AND FILM FEEDING MECHANISM

Roy A. Clapp, Minneapolis, Minn.

Application December 14, 1950, Serial No. 200,799

3 Claims. (Cl. 88—18.4)

1

This invention relates to motion picture cameras and more particularly to an improved film progressing shuttle mechanism which permits manufacture of a compact camera unit.

It is an object of the invention to provide a motion picture camera with shuttle mechanism which is adapted to oscillate toward and away from the film and to reciprocate along its axis of oscillation, so that as the film is alternately engaged and disengaged, it will be progressed with a step-by-step movement, and wherein improved spring and cam means are provided for producing such movement with a high degree of accuracy and smoothness without requiring close machining tolerances.

Another object of the invention is to provide means for actuating a shuttle in the manner set forth above which includes compound cam means mounted upon a single cam shaft so that the shaft and compound cam means rotate as an integral unit, as distinguished from individual cam elements mounted upon separate cam shafts.

A further object of the invention is to provide a shuttle which is adapted to be inexpensively manufactured by a series of stamping operations in which no close tolerances must be maintained and which is of low mass so that its reciprocating and oscillating strokes can be rapidly and smoothly reversed with a minimum of wear and vibration, and which is provided with means for resisting and damping out vibration due to inertia of said shuttle.

It is still another object to provide a shuttle and operating mechanism in which possible variations in the end play of the operating cam shaft do not affect the smooth and positive action of said shuttle.

A further object of the invention is to provide shuttle mechanism which is so constructed that the film aperture engaging claw will automatically find one of the apertures along the side of the film even though the film has been initially threaded into the camera with the aperture spacing misaligned with the path of travel of the claw.

Another object of the invention is to provide a compact motion picture sound camera containing only a pair of operating shafts journaled within the casing, one of said shafts operating the constant speed driving sprocket and cooperating with the sound recording mechanism to simultaneously record a sound track when the film is being exposed and the other shaft operating an intermittent film feeding mechanism and shutter mechanism to produce a compact camera unit.

The above and other objects and advantages

2 of the invention will more fully appear from the following description made in connection with the accompanying drawings, wherein like reference characters refer to the same parts throughout the several views, and in which Fig. 1 is a perspective view of a motion picture camera;

Fig. 2 is a front elevational view of the camera body with its front casing portion removed;

Fig. 3 is a horizontal sectional view through the camera casing showing the operating parts in plan;

Fig. 4 is a vertical sectional view through the casing showing the operating parts in side elevation;

Fig. 6 is an enlarged fragmentary side view of the shuttle mechanism and showing the shutter in section;

Fig. 7 is an enlarged fragmentary vertical sectional view showing the shuttle mechanism in front elevation;

Fig. 8 is an enlarged fragmentary horizontal sectional view showing said shuttle mechanism in top plan and including a portion of the shutter;

Fig. 9 is a perspective of the shuttle and its operating cam unit;

Figure 5:
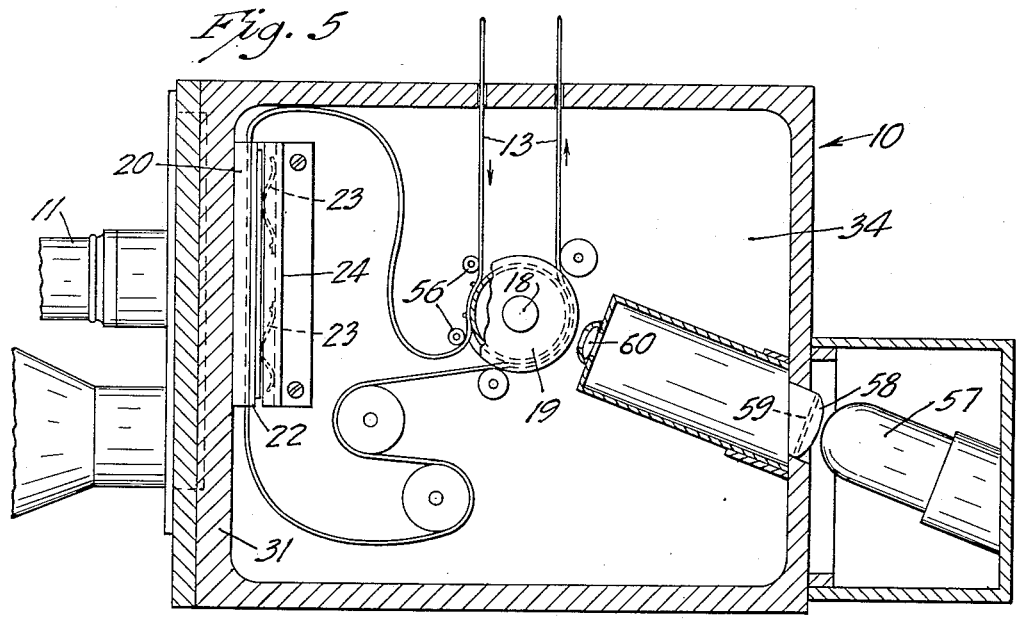
Fig. 5 is a vertical sectional view taken through the camera casing, and showing the operating parts in side elevation as viewed from the opposite side to Fig. 4.

In Fig. 1 there is shown the upper portion of a camera tripod 9 having a camera casing 10 thereon. Extending from the forward portion of the casing is a lens assembly 11. Mounted on the top of the casing are reel holders 12 which carry film which is fed through the camera. A portion of the film is shown at 13 in Figs. 5, 6, and 7.

As shown in Figs. 3 and 4, on the rear of the casing 10 is a motor 14. A main drive shaft 15 extends into the casing from the motor 14. Mounted on the shaft 15 is a worm 16 which is meshed with a worm gear 17 on a cross shaft 18. The cross shaft 18 carries a film sprocket pulley 19 which is adapted to pull the film through the camera from one of the reel holders 12.

To the right or the front of the film sprocket pulley 19, as viewed in Fig. 3, is a film gate 20 having a film receiving guide 21 fastened therein. The film gate 20 has a movable cover plate 22 which is held in position by a leaf spring 23 mounted on a bracket 24, as illustrated in Figs. 3 and 8.

The main drive shaft 15 extends to the forward or right hand end of the casing 10 as viewed in Figs. 3 and 4. As shown in Fig. 2, the forward end of the shaft 15 is provided with a gear 25 which meshes with an idler gear 26, the latter in turn meshing with and driving a gear 27 on a cam shaft 28. Immediately in front of the gear 27 is a shutter 29 fixed to shaft 28, and which, as shown in Fig. 2, alternately blocks and exposes a light aperture 30 which extends through a forward casing partition 31 in alignment with the film gate 20. The cam shaft 28 extends rearwardly a short distance and has its rear end mounted in a bearing block 32 which is secured by a bolt 33 to a longitudinal partition or frame member 34, said partition 34 also serving to support the film pulley shaft 18.

As shown in Figs. 6 and 7, a C-shaped bracket extends from the partition 34. Extending toward each other from the upper and lower horizontal portions of the bracket 35 are aligned stub shafts or trunnions 36. Mounted upon these stub shafts or trunnions 36 is a shuttle indicated generally as 37 and is designated as form A of my invention as viewed in Figs. 6 through 9 inclusive. It includes a generally rectangular open body portion 38 through which the cam shaft 28 extends, as best shown in Figs. 7 and 9. The upper portion of the shuttle body 38 has an angular apertured ear 39 thereon which is slidably and rotatably received on the upper ends of the stub shafts 36. The lower portion of the shuttle body 38 is provided with an apertured ear 40 which is slidably and rotatably received upon the lower of the two aligned stub shafts 36. Thus the shuttle 37 can be rocked or oscillated about the trunnions 36 as an axis and said shuttle can also reciprocate vertically on the trunnions 36. Extending from the lower right hand corner of the shuttle body 38, as viewed in Fig. 9, is an angular claw 41 which is adapted to fit into the conventional longitudinally spaced film apertures 42 shown in Figs. 7 and 8.

In form A of my invention the inside horizontal edges of the centrally open shuttle body 38 are bent over as shown at 43 in Fig. 9 to provide cam thrust receiving surfaces. Extending rearwardly from the left hand side of the shuttle body 38 is a C-shaped element 44 which constitutes a second cam thrust engaging portion of the shuttle. Secured to the rear side of the shuttle body 38 and extending laterally and rearwardly from the medial portion of the shutter body is a roughly C-shaped wire spring 45, which, as shown in Figs. 7 and 9, is spaced a considerable distance to the right of the cam thrust engaging element 44.

On the cam shaft 28 is a rearwardly disposed constant diameter cam 46. The cam 46 is positioned to engage the cam thrust receiving element 44. When the cam shaft 28 and cam 46 are rotated, the cam will bear against the thrust receiving element 44 and oscillate the shuttle 37 in one direction. Said cam 46 through another portion of its cycle of movement will bring its high portion into engagement with the C-shaped wire spring 45 to return the shuttle with an oscillatory movement in an opposite direction. This oscillatory movement of the shuttle 37 causes the claw 41 to move into and out of the plane of the film 13 as it passes through the film gate 20.

Also on the cam shaft 28 is a second constant diameter cam 47, this cam in the form shown being an eccentric. The cam 47 lies between the upper and lower horizontal portions of the shuttle body 38 and is adapted to impart its thrust against the thrust receiving portions 43 of said shuttle body. The cam 47 is also mounted for rotation with the shaft 28 and its movement causes the shuttle 37 to reciprocate vertically on the stub shafts 36.

The action of the cam 46 on the shuttle 37 is such that there is a sharp oscillatory movement about the stub shafts 36 in one direction followed by a period of rest insofar as the oscillation is concerned, and then a return oscillatory movement following by another period of rest. Consequently, the claw 41 is held in one of the film apertures 42, while the shuttle 37 ceases to oscillate temporarily. The cam 47 will then begin to move the shuttle 37 vertically to carry the claw 41 into alignment with one of the film apertures 42, and the film will then be properly positioned to have its openings 42 subsequently successively aligned with a claw 41.

The wire spring 45 is of importance in performing two functions. It not only permits yielding oscillatory movement of the shuttle relative to the oscillating cam 46 until the vertical shifting movement of the shuttle is started, at which time the claw 41 will spring into one of the openings 42 of the film and will be shifted by the reciprocating movement of the shuttle, but it also produces a yieldable gripping action on the cam 46, which frictionally resists the force of inertia and damps out excessive thrusts in a vertical direction and materially adds to the smoothness of the reciprocatory motion. The spring 45 is tensioned slightly by the cam 46 and bows out somewhat to produce the frictional resistance on the cam surface.

Figure 10:
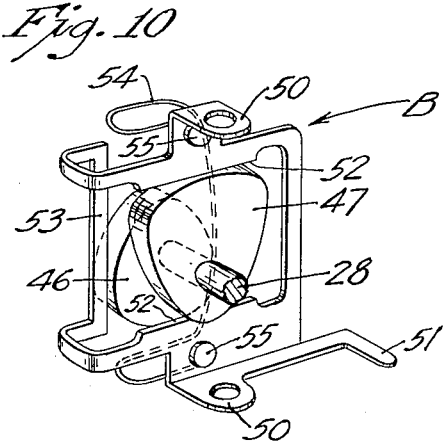
Fig. 10 is a perspective view of an alternative form of shuttle showing the operating cams as mounted therein.
Figure 11:
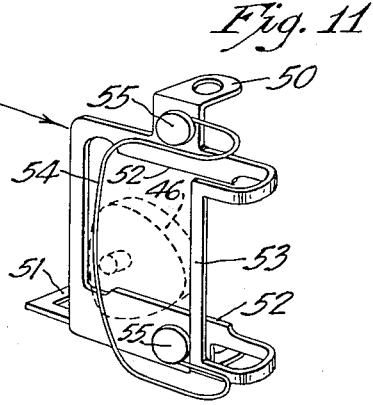
Fig. 11 is a perspective view of the shuttle shown in Fig. 10, as viewed from opposite sides from Fig. 10.

In form B of my invention, as illustrated in Figs. 10 and 11, a shuttle having its body made entirely from a single piece of material is formed. The operation of this form B shuttle is identical to that previously described for form A. However, the construction of the body is somewhat different. A pair of supporting ears 50 similar to the ears 39 are formed on said body and are apertured to receive the trunnions or shafts 36. A claw 51 generally similar to claw 41 is formed at one end of the body. A pair of opposed reciprocatory cam follower surfaces 52 are formed in spaced relation at the central portion of said body, and do not have the angular flanges shown in the shuttle 37. An oscillatory cam follower 53 is integrally formed with the shuttle body as by being formed from the end portion thereof doubled back upon itself as shown in Figs. 10 and 11. The spring 54 in form B of my invention is of improved design and is doubled back upon itself to provide additional resilience and length. This spring is of substantially the same shape as the doubled back portion of the end of the shuttle body forming the cam follower 53. The ends of spring 54 are fixed to the body by any suitable means such as the rivets 55. It has been found that in form B of my invention a less expensive shuttle may be produced which, with the additional resilience provided in the spring 54, operates with improved efficiency.

With this improved shuttle construction, it is possible to produce a motion picture camera unit of extremely compact design and having only two operating shafts, namely, cam shaft 28 and cross shaft 18. These two shafts with their suitable driving connections operate all the film moving mechanisms within the camera. By providing a shuttle mechanism having only a single cam shaft with a pair of tangential cams mounted thereon, the internal mechanism has been greatly simplified. Also, as best shown in Fig. 5, the constant speed film driving sprocket 19 fixed to shafts 18 has the strip of film 13 engaged therewith on opposite sides thereof. A pair of of suitable pressure rollers 56 hold the film strip 13 in engagement with one side of the sprocket 19 before the same travels up for engagement with the intermittent driving shuttle. When the film returns from the shuttle mechanism, it passes upwardly around the lower portion of the sprocket pulley 19, as best shown in Fig. 5, and sound recording apparatus exposes the sound tracks along one marginal edge portion of the film 13. This sound recording apparatus constitutes in the form shown, a suitable electronic sound responsive tube 57, which, in response to the sound impulses, directs a beam of light through a lens 58, slotted disc 59, and a second lens 60, which focuses the same upon the strip of film 13.

It will be seen that I have provided an extremely simple, yet highly efficient sound motion picture camera, having a particularly ingenious shuttle design and arrangement of the parts therein to produce a compact unit. The shuttle design permits relatively inexpensive construction in which close tolerances are not required for efficient and smooth operation of the driving mechanism. A pair of tangential cams 46 and 47 are mounted on a single shaft 48 on which the shutter 29 is also mounted and these cams serve to produce both the reciprocating and oscillating action of the film engaging claw 51. The spring 54 permits the claw 51 to momentarily ride on an imperforate portion of the film if said film is not properly positioned initially in the intermittent feeding device. Said spring also damps out sudden thrusts produced in the reciprocating action of cam 47, and produces an extremely smooth reciprocatory action on the claw 51.

It will, of course, be understood that various changes may be made in the form, details, arrangement and proportions of the various parts without departure from the scope of the present invention, which, generally stated, consists in the matter shown, and described, and set forth in the appended claims.

What I claim is:

1. An intermittent film feeding shuttle mechanism for motion picture camera and the like comprising a shuttle body, a film engaging element for intermittent engagement with the perforations of a film strip and fixed to said shuttle body, support means for said body to permit oscillation as well as reciprocation thereof, a single cam shaft adapted to be driven, a pair of radial cams fixed to said shaft, a pair of spaced parallel reciprocating cam following elements fixed to said shuttle body and having one of said cams interposed therebetween to impart reciprocating movement to said shuttle, a second pair of spaced cam following elements transversely offset from said first mentioned cam follower elements and having the other cam interposed therebetween and being elongated to ride along said last mentioned cam as said body is reciprocated, the cam following surfaces of said second pair of followers being disposed substantially normal to the planes of said first mentioned cam following elements, one of said second mentioned elements being resilient.

2. As an article of manufacture, an intermittent film feeding shuttle mechanism for motion picture cameras and the like comprising a shuttle body made entirely from a single piece of material by suitable stamping operations thereon and having a pair of opposed supporting ears adapted to be mounted for reciprocating and oscillating movement, a central cut-out portion forming a pair of spaced parallel cam following surfaces, a film engaging claw disposed outwardly from one end of said cam following surfaces, the other end of said body being doubled back upon itself to form a cam following surface at the end extremity of said body and disposed transversely of said first mentioned cam following surface and a resilient element extending in spaced relation to said last mentioned cam following surface and having its end fixed to said shuttle body.

3. In a motion picture camera, a film-feeding shuttle unit comprising a shuttle body having film-engaging means thereon, elongated supporting means mounted on said body and constructed to permit pivotal oscillation thereof and reciprocation along the axis of oscillation, said shuttle body being constructed to provide two pair of interconnected cam follower elements, the elements of each pair being disposed in spaced substantially parallel relation to each other, a pair of coaxial radial cams respectively interposed between the two pairs of follower elements and having the circumferential edge portions thereof respectively engaging the cam follower elements for actuating said shuttle on said supporting means, one pair of cam follower elements being transversely offset from the other pair of elements and from the axis of oscillation of said body and being elongated to ride along the oscillating cam during reciprocation of said shuttle body by said reciprocating cam, said elongated cam follower elements being disposed normally to planes through the other elements lying tangent to the respective follower-engaging portions of the reciprocating cam whereby synchronized rotation of the cams will produce synchronized reciprocation and pivotal oscillation of the shuttle body on said supporting means, the elongated oscillating cam follower element for urging the film engaging means of said shuttle body into film-engaging position being resiliently yieldable to prevent injury to the film if precise registered alignment with a perforation is not obtained by said film-engaging means, and said resilient cam follower element comprising an elongated spring wire concavely curved relative to the engaged portion of the oscillating cam to produce increased resistance at the end portions thereof.

ROY A. CLAPP.

References Cited in the file of this patent

UNITED STATES PATENTS

| Number | Name | Date |
|---|---|---|
| 1,620,726 | Howell | Mar. 15, 1927 |
| 1,976,338 | Fritts | Oct. 9, 1934 |
| 2,480,162 | Rath | Aug. 30, 1949 |